Patented June 5, 1945

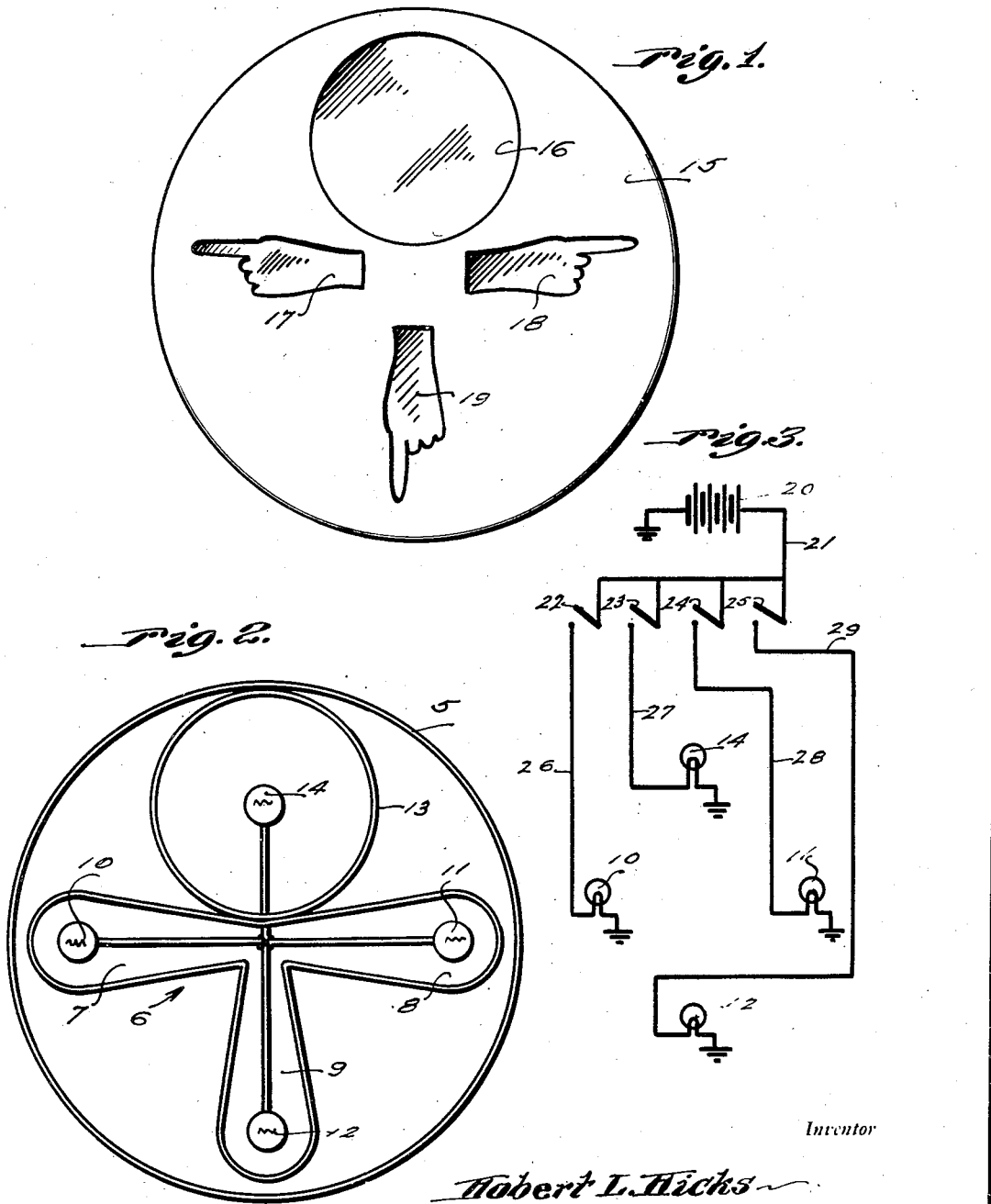

2,377,419

UNITED STATES PATENT OFFICE 2,377,419

VEHICLE SIGNAL LIGHT

Hobert L. Hicks, Vancouver, Wash.

Application April 1, 1944, Serial No. 529,151

1 Claim. (Cl. 177—329)

This invention relates to new and useful improvements in signals especially adapted for land vehicles.

The principal object of the present invention is to provide a direction signal for automobiles and the like which can be operated at the will of the driver for indicating to trailing motorists the direction in which he intends to travel or turn.

Another important object of the invention is to provide a unitary structure in which right and left turn signal lights are employed in conjunction with a stop and tail light.

Other objects and advantages of the invention will become apparent to the reader of the following description.

In the drawing:

Figure 1 represents a front view of the signal structure.

Figure 2 is a front elevation with the cover removed.

Figure 3 is a diagrammatic view showing the electrical connections between the electrical devices involved.

Referring to the drawing wherein like numerals designate like parts, it can be seen that the signal consists of a circular case 5 having a T-shaped compartment generally referred to by numeral 6 therein defining elongated compartments 7, 8 and 9, in which are electric bulbs 10, 11 and 12, the compartments 7 and 8 being horizontally disposed in opposite directions, while the compartment 9 is disposed downwardly.

Situated above the T-shaped structure 6 is a circular compartment 13 in which is an electric bulb 14.

A cover 15 is provided for the case 5 and this has a circular window 16 in the upper portion thereof for disposition over the circular partition 13, the bulb 14 serving as a tail light.

The cover 15 further has oppositely pointing, horizontally disposed hand formed windows 17 and 18 which are located over the compartments 7 and 8, for indicating left and right turns.

A third downwardly pointing hand formed window 19 is located over the lamp compartment 9 and this is utilized when the driver intends to stop.

As can be seen in Figure 3, numeral 20 denotes a source of current having a lead 21 therefrom to switches 22, 23, 24 and 25.

A lead 26 extends from the switch 22 to the lamp 10, a lead 27 extends from the switch 23 to the lamp 14, a lead 28 extends from the switch 24 to the lamp 11 and a lead 29 extends from the switch 25 to the lamp 12.

It is preferable that the switches 22, 23, 24 and 25 be located in close proximity, but if desired, only the switches 22 and 24 may be located in close proximity and the switches for the tail light 14 and the stop light 12 be located in the usual manner, the latter being operated by the usual foot brake pedal.

Further, the switches 22 and 24 for the left and right signals may be automatically operated by the usual steering mechanism (not shown).

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A direction signal device for automobiles comprising a cylindrical casing open at one end, a unitary T-shaped compartment frame within said casing dividing said casing into a narrow elongated pocket approximately along a horizontal diameter of the casing, a second narrow pocket at right angles to the first pocket and along a radius of said casing, a second cylindrical casing open at bath ends placed within said first casing above said T-shaped frame, a cover for said first casing having three narrow indicia forming windows covering the pockets formed by the T-shaped frame and a circular window covering the exposed open end of the second cylindrical casing, an electric lamp in each pocket and in said second cylindrical casing.

HOBERT L. HICKS.